United States Patent
White, Jr. et al.

(10) Patent No.: US 9,641,915 B2
(45) Date of Patent: May 2, 2017

(54) SENSOR DATA BROKER FOR DIRECTED COLLECTION OF SENSOR DATA BETWEEN MOBILE COLLECTOR DEVICE AND SENSOR CONSUMER

(71) Applicant: Cisco Technology, Inc., San Jose, CA (US)

(72) Inventors: David C. White, Jr., Durham, NC (US); Jay Kemper Johnston, Raleigh, NC (US); Magnus Mortensen, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 39 days.

(21) Appl. No.: 14/706,797

(22) Filed: May 7, 2015

(65) Prior Publication Data

US 2016/0330534 A1    Nov. 10, 2016

(51) Int. Cl.
*H04M 3/42* (2006.01)
*H04Q 9/00* (2006.01)
*H04L 12/28* (2006.01)

(52) U.S. Cl.
CPC ........... *H04Q 9/00* (2013.01); *H04L 12/2825* (2013.01); *H04Q 2209/50* (2013.01)

(58) Field of Classification Search
CPC ... H04Q 9/00; H04Q 2209/50; H04L 12/2825
USPC ........... 455/412.1–414.2, 404.2, 418–422.1, 455/456.1, 457, 552.1, 41.1–41.2
See application file for complete search history.

(56) References Cited

U.S. PATENT DOCUMENTS

| | | | | |
|---|---|---|---|---|
| 8,032,124 B2* | 10/2011 | Karkanias | ............... | H04L 29/06 340/539.12 |
| 8,422,471 B2* | 4/2013 | Kurose | ............... | H04M 1/7253 370/338 |
| 8,666,403 B2* | 3/2014 | Yu | ......................... | H04W 60/00 455/406 |
| 2004/0015410 A1* | 1/2004 | Kimura | .................. | G06Q 30/06 705/27.2 |

(Continued)

OTHER PUBLICATIONS

Self-Interest-Driven Incentives for Ad Dissemination in Autonomous Mobile Social Networks; Ting Ning, Zhipeng Yang, Hongyi Wu, and Zhu Han; 2013 Proceedings IEEE INFOCOM.*

(Continued)

*Primary Examiner* — Babar Sarwar
(74) *Attorney, Agent, or Firm* — Leon R. Turkevich

(57) ABSTRACT

In one embodiment, a method comprises receiving, by a broker device in a persistent data network, a request from one or more sensor consumers for sensor data originated by one or more isolated sensor devices, the isolated sensor devices not reachable by any wired or wireless infrastructure; sending, by the broker device via the persistent data network in response to the request, a message to a mobile collector device indicating an instruction for obtaining the sensor data from the one or more isolated sensor devices; and receiving, by the broker device in the persistent data network, the sensor data from the mobile collector device having established a local data connection with the one or more isolated sensor devices, and in response causing sending of a credit for receiving the sensor data to a registered user of the mobile collector device.

21 Claims, 6 Drawing Sheets

(56) References Cited

U.S. PATENT DOCUMENTS

| | | | | |
|---|---|---|---|---|
| 2004/0078341 | A1* | 4/2004 | Steichen | G06Q 30/06 705/64 |
| 2006/0178148 | A1* | 8/2006 | Du | H04W 76/023 455/445 |
| 2007/0095903 | A1* | 5/2007 | Suenbuel | G06F 17/3087 235/383 |
| 2011/0111726 | A1* | 5/2011 | Kholaif | G01S 1/68 455/404.2 |
| 2012/0101912 | A1* | 4/2012 | Sen | H04L 67/12 705/26.3 |
| 2013/0231088 | A1* | 9/2013 | Jabara | G06Q 10/101 455/411 |
| 2013/0304600 | A1* | 11/2013 | Sen | G06Q 30/08 705/26.3 |
| 2014/0119234 | A1* | 5/2014 | Kwon | H04W 76/025 370/254 |
| 2014/0126348 | A1* | 5/2014 | Mahamuni | H04L 45/22 370/218 |
| 2014/0162701 | A1* | 6/2014 | Jellinek | H04W 4/023 455/456.6 |
| 2014/0181916 | A1* | 6/2014 | Koo | H04W 12/08 726/4 |
| 2014/0320585 | A1* | 10/2014 | Igoe | H04L 12/2809 348/14.04 |
| 2015/0087231 | A1* | 3/2015 | Sinha | H04W 4/008 455/41.2 |
| 2016/0026983 | A1* | 1/2016 | Lindsley | G06Q 20/123 705/26.81 |
| 2016/0165440 | A1* | 6/2016 | Bae | H04L 12/2816 455/411 |

OTHER PUBLICATIONS

Design and Analysis of Delay-Tolerant Sensor Networks for Monitoring and Tracking Free-Roaming Animals; Samina Ehsan, Kyle Bradford, Max Brugger, Bechir Hamdaoui, Yevgeniy Kovchegov, Douglas Johnson, and Mounir Louhaichi; 1220 IEEE Transactions on Wireless Communications, vol. 11, No. 3, Mar. 2012.*

Open Data Kit Sensors:Mobile Data Collection with Wired and Wireless Sensors;Rohit Chaudhri, Waylon Brunette, Mayank Goel, Rita Sodt, Jaylen VanOrden, Michael Falcone, Gaetano Bordello Department of Computer Science and Engineering University of Washington, Seattle, WA [usa];Copyright © 2012 ACM 978-01-4503-1262-2/12/03 . . . $10.00" 23].*

PRISM: Platform for Remote Sensing using Smartphones;pRashanth et al.;Copyright 2010 ACM 978-1-60558-985-5/10/06 . . . $10.00.*

Development of Rest Facility Information Exchange System by Utilizing Delay Tolerant Network;Masahiro et. al.;vol. 5, No. 2, 2014.*

From "Smart Objects" to "Social Objects": The Next Evolutionary Step of the Internet of Things;Luigi et. al.;IEEE Communications Magazine o Jan. 2014.*

Smart: A Secure Multilayer Credit-Based Incentive Scheme for Delay-Tolerant Networks;Haojin Zhu, Member, IEEE, Xiaodong Lin, Member, IEEE, Rongxing Lu, Student Member, IEEE, Yanfei Fan, and Xuemin (Sherman) Shen, Fellow, IEEE;4628 IEEE Transactions on Vehicular Technology, vol. 58, No. 8, Oct. 200.*

Hypercube-Based Multipath Social Feature Routing in Human Contact Networks;Jie Wu, Fellow, IEEE, and Yunsheng Wang;IEEE Transactions on Computers, vol. 63, No. 2, Feb. 2014.*

Cisco, "Cisco Data in Motion Application Programming Interface Reference Guide, Release 1.0.1," [online], Feb. 25, 2015, [retrieved on May 6, 2015]. Retrieved from the Internet: <URL: https://developer.cisco.com/fileMedia/download/d3b70460-0f0a-4ff6-954a-7066bc4982c0>, pp. 1-28.

Atzori, et al., "From 'Smart Objects' to 'Social Objects': The Next Evolutionary Step of the Internet of Things," IEEE Communications Magazine, vol. 52, No. 1, Jan. 2014, pp. 97-105, doi: 10.1109/MCOM.2014.6710070.

Neuner et al., "Demo: Energy-Efficient Status Monitoring in Sensor Networks Using Adaptive Piggybacking", [online], [retrieved om May 6, 2015]. Retrieved from the Internet: <URL: http://www.ieeelcn.org/prior/LCN38/lcn38demos/Demo7-Neuner.pdf>, 3 pages.

Chaudhri et al., "Open Data Kit Sensors: Mobile Data Collection with Wired and Wireless Sensors", [online], DEV'12, Mar. 11-12, Atlanta, GA, [retrieved on May 6, 2015]. Retrieved from the Internet: <URL: http://opendatakit.org/wp-content/uploads/2012110/dev2012.pdf>, 10 pages.

Ning et al., "Incentive-Aware Data Dissemination in Delay-Tolerant Mobile Networks", [online], [retrieved on Aug. 29, 2014]. Retrieved from the Internet: <URL: http://www.cacs.louisiana.edu/~wu/paper/dtn-secon11.pdf>, 9 pages.

Ehsan, et al., "Design and Analysis of Delay-Tolerant Sensor Networks for Monitoring and Tracking Free-Roaming Animals," IEEE Transactions on Wireless Communications, vol. 11, No. 3, Mar. 2012, pp. 1220-1227, doi: 10.1109/TWC.2012.012412.111405.

El Defrawy, et al., "Leveraging Social Contacts for Message Confidentiality in Delay Tolerant Networks," COMPSAC '09: 2009 33rd Annual IEEE International Computer Software and Applications Conference, Jul. 20-24, 2009, pp. 271-279, doi: 10.1109/COMPSAC2009.43.

Guo et al., "Opportunistic IoT: Exploring the social side of the internet of things," Computer Supported Cooperative Work in Design (CSCWD), 2012 IEEE 16th International Conference on Computer Supported Cooperative Work in Design, May 23-25, 2012, pp. 925-929, doi: 10.1109/CSCWD.2012.6221932.

Chaturvedi et al., "Poster: Improving Delay-Tolerant Network Performance Using Forward Routing Information", [online], 2006, [retrieved on May 6, 2015]. Retrieved from the Internet: <URL: http://www.ieee-icnp.org/2006/posters/icnp06-posters-chaturvedi.pdf>, pp. 19-20.

Yi et al., "Mobile Sensor Data Collector using Android Smartphone", IEEE 2012, pp. 956-959.

Wagner, "Google Exec: Internet of Things Requires 'Brand New Network'", Light Reading Neworking the Telecom Community, [online], Jun. 10, 2014, [retrieved on May 6, 2015]. Retrieved from the Internet: <URL: http://www.lightreading.com/iot/google-exec-internet-of-things-requires-brand-new-network/d/d-id/709381?print=yes>, 2 pages.

Ning et al., "Self-Interest-Driven Incentives for Ad Dissemination in Autonomous Mobile Social Networks", [online], 2013, [retrieved on Aug. 29, 2014]. Retrieved from the Internet: <URL: http://www.cacs.louisiana.edu/~wu/paper/mason-infocom13.pdf>, pp. 2358-2366.

Das et al., "PRISM: Platform for Remote Sensing using Smartphones", [online], MobiSys '10, Jun. 15-18, 2010, [retrieved on May 6, 2015]. Retrieved from the Internet: <URL: http://research.microsoft.com/pubs/131575/mobi096-das.pdf>, 14 pages.

Mulligan et al., "Demo Abstract: Seamless Sensor Network IP Connectivity", [online], [retrieved on May 6, 2015]. Retrieved from the Internet: URL: http://dunkels.com/adam/mulligan09seamless.pdf>, 2 pages.

Zhao et al., "Controlling the Mobility of Multiple Data Transport Ferries in a Delay-Tolerant Network", [online], Retrieved from the Internet: <URL: http://hondo.informatik.uni-freiburg.de/teaching/seminar/adhoc-w08/papers/multiMsgFerries.pdf>, 12 pages.

Cobham, "NetLink Store and Forward Solutions", [online], Mar. 2010, [retrieved on May 6, 2015]. Retrieved from the Internet: <URL: http://www.cobham.com/media/71486/netlink%20store%20and%20forward.pdf>, 4 pages.

Ono et al., "Development of Rest Facility Information Exchange System by Utilizing Delay Tolerant Network", [online], IJACSA col. 5, No. 2, 2014, [retrieved on Aug. 29, 2014]. Retrieved from the Internet: <URL: http:/thesai.org/Downloads/Volume5No2/Paper_13-Development_of_Rest_Facility_Information_Exchange_System_by_Utilizing_Delay_Tolerant_Network.pdf>, pp. 83-89.

(56) References Cited

OTHER PUBLICATIONS

Viswanathan et al., "Message Ferrying for Constrained Scenarios", [online], [retrieved on May 6, 2015]. Retrieved from the Internet: <URL: http://wbox0.cse.lehigh.edu/~chuah/publications/ramesh_poster_final.pdf>, 3 pages.

Zhu et al., "SMART: A Secure Multilayer Credit-Based Incentive Scheme for Delay-Tolerant Networks", [online], IEEE Transactions on Vehicular Technology, col. 58, No. 8, Oct. 2009, [retrieved on Aug. 29, 2014]. Retrieved from the Internet: <URL: http://bbcr.uwaterloo.ca/~xshen/paper/2009/sasmlo.pdf>, pp. 4628-4639.

Stevens, "Shark RS232/RS485 Adapter with Bluetooth Technology", [online], [retrieved on May 6, 2015]. Retrieved from the Internet: <URL: http://www.stevenswater.com/catalog/Product.aspx?SKU=%2780000%27>, 1 page.

SIGFOX, "SIGFOX and TI Working Together for Low-cost, Low-Power IoT Connectivity" [online] 2014, [retrieved on May 6, 2015]. Retrieved from the Internet: <URL: http://www.sigfox.com>, 3 pages.

Stevens, "Radios for Environmental Data Telemetry", [online], [retrieved on May 6, 2015]. Retrieved from the Internet: <URL: http://www.stevenswater.com/telemetry_com/radio.aspx>, 1 page.

Teledesign Systems, Inc., "TS4000 Radio Modem", [online], [retrieved on May 6, 2015]. Retrieved from the Internet: <URL: http://www.teledesignsystems.com/ts4000.html>, pp. 1-3.

Wikipedia, "Automatic meter reading", [online], Mar. 9, 2015, [retrieved on May 6, 2015]. Retrieved from the Internet: <URL: http://en.wikipedia.org/w/index.php?title=Automatic_meter_reading&printable=yes>, pp. 1-8.

Wu, et al., "Analysis of smartphone user mobility traces for opportunistic data collection in wireless sensor networks" (Abstract), [online], Dec. 2013, [retrieved on May 8, 2015]. Retrieved from the Internet: <URL: http://www.sciencedirect.com/science/article/pii/S1574119213000850>, 2 pages.

Wu et al., "Hypercube-Based Multipath Social Feature Routing in Human Contact Networks," IEEE Transactions on Computers, vol. 63, No. 2, Feb. 2014, pp. 383-396, doi: 10.1109/TC.2012.209.

Lindsley et al., U.S. Appl. No. 14/340,770, filed Jul. 25, 2014.

\* cited by examiner

SENSOR DATA BROKER FOR DIRECTED COLLECTION OF SENSOR DATA BETWEEN MOBILE COLLECTOR DEVICE AND SENSOR CONSUMER

TECHNICAL FIELD

The present disclosure generally relates to a sensor data broker for directing collection of sensor data between a mobile collector device and one or more sensor consumers.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet of Things (IoT) is expected to result in the deployment of millions of sensor devices deployed by organizations to capture sensor data in locations worldwide, including remote locations that do not have any existing wireless infrastructure (e.g., wireless telephony such as 3G or 4G LTE, wireless Internet, etc.). Delay tolerant networking has been proposed to enable a mobile collector device (e.g., a "smart phone", "smart tablet", etc.) to serve as a store-and-forward device that can collect sensor data from an isolated sensor, and forward the sensor data to another network device.

Different proposals suggest an incentive for a user of a portable device, where the incentive would stimulate the user to use his or her portable device as a mobile collector device to collect the sensor data from an isolated sensor and forward the sensor data to another network device.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
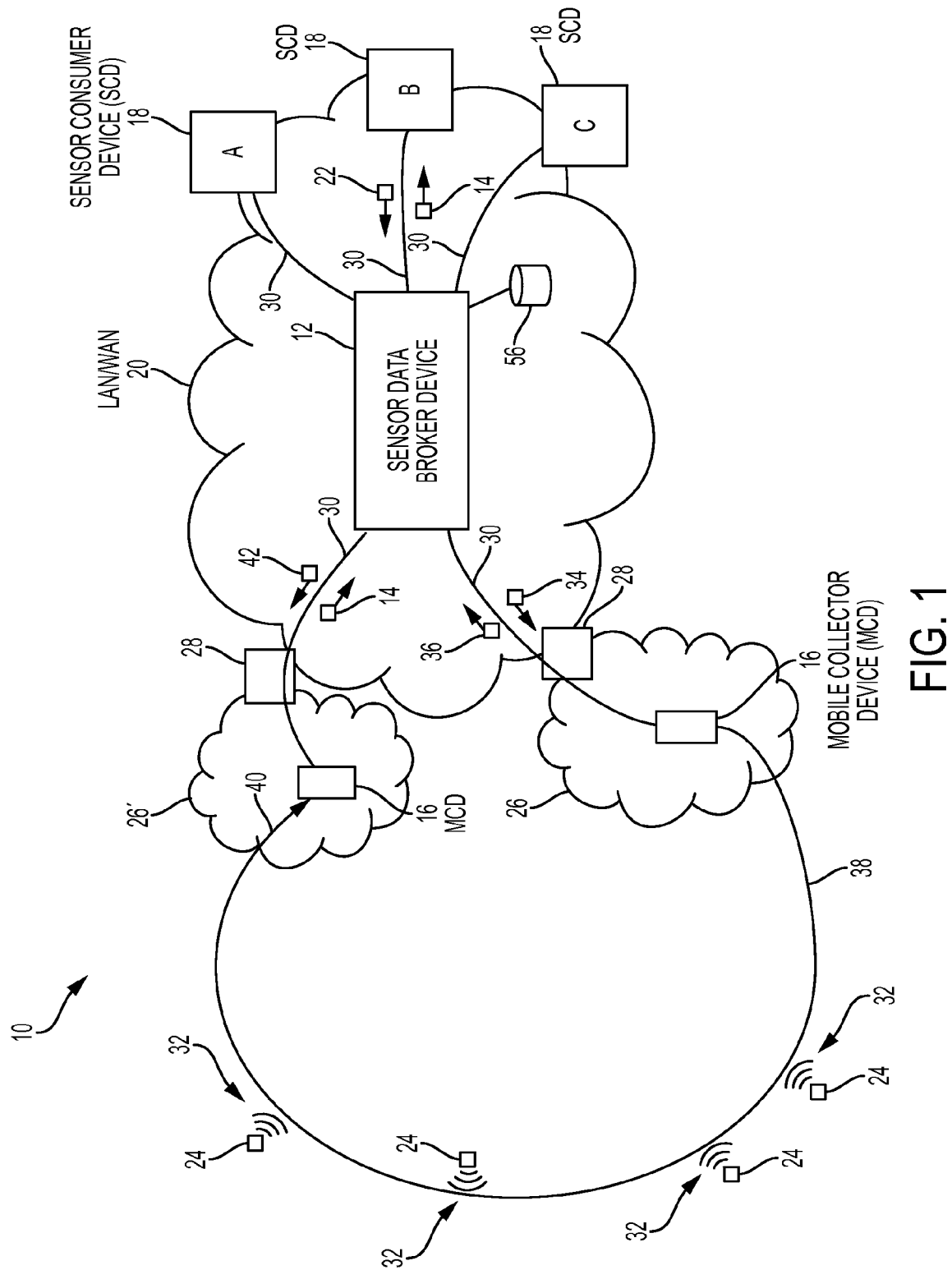
FIG. 1 illustrates an example system having a sensor data broker device configured for directing collection of sensor data between a mobile collector device and one or more sensor consumer devices, according to an example embodiment.

In one embodiment, a method comprises receiving, by a broker device in a persistent data network, a request from one or more sensor consumers for sensor data originated by one or more isolated sensor devices, the isolated sensor devices not reachable by any wired or wireless infrastructure; sending, by the broker device via the persistent data network in response to the request, a message to a mobile collector device indicating an instruction for obtaining the sensor data from the one or more isolated sensor devices; and receiving, by the broker device in the persistent data network, the sensor data from the mobile collector device having established a local data connection with the one or more isolated sensor devices, and in response causing sending of a credit for receiving the sensor data to a registered user of the mobile collector device.

In another embodiment, an apparatus comprises a device interface circuit and a processor circuit. The device interface circuit is configured for receiving, in a persistent data network, a request from one or more sensor consumers for sensor data originated by one or more isolated sensor devices. The isolated sensor devices are not reachable by any wired or wireless infrastructure. The processor circuit is configured for generating and sending, in response to the request, a message to a mobile collector device indicating an instruction for obtaining the sensor data from the one or more isolated sensor devices. The device interface circuit further is configured for receiving, via the persistent data network, the sensor data from the mobile collector device having established a local data connection with the one or more isolated sensor devices. The processor circuit further is configured for causing sending of a credit for receiving the sensor data, to a registered user of the mobile collector device, in response to reception of the sensor data.

In another embodiment, one or more non-transitory tangible media are encoded with logic for execution by a machine and when executed by the machine operable for: receiving, by a device in a persistent data network, a request from one or more sensor consumers for sensor data originated by one or more isolated sensor devices, the isolated sensor devices not reachable by any wired or wireless infrastructure; sending, by the device via the persistent data network in response to the request, a message to a mobile collector device indicating an instruction for obtaining the sensor data from the one or more isolated sensor devices; and receiving, by the device in the persistent data network, the sensor data from the mobile collector device having established a local data connection with the one or more isolated sensor devices, and in response causing sending of a credit for receiving the sensor data to a registered user of the mobile collector device.

In yet another embodiment, method comprises receiving, by a mobile collector device from a broker device via a persistent data network, a message indicating an instruction for obtaining sensor data originated by one or more isolated sensor devices, the isolated sensor devices not reachable by any wired or wireless infrastructure; establishing, while the mobile collector device is disconnected from the persistent data network and the wired or wireless infrastructure, a local data connection with the one or more isolated sensor devices based on being within proximity thereof; the mobile collector device retrieving and storing the sensor data from the one or more isolated sensor devices via the local data connection based on the message; and the mobile collector device forwarding the sensor data to the broker device in response to having reconnected to the persistent data network following disconnecting from the local data connection, including receiving notification of a credit for forwarding the sensor data.

In another embodiment, an apparatus comprises a first device interface circuit, a second device interface circuit, a processor circuit, and a memory circuit. The first device interface circuit is configured for receiving, from a broker device via a persistent data network, a message indicating an instruction for obtaining sensor data originated by one or more isolated sensor devices, the isolated sensor devices not reachable by any wired or wireless infrastructure. The second device interface circuit is configured for establishing, while the apparatus is disconnected from the persistent data network and the wired or wireless infrastructure, a local data connection with the one or more isolated sensor devices based on being within proximity thereof. The processor circuit is configured for retrieving the sensor data via the local data connection from the one or more isolated sensor devices based on the message. The memory circuit is configured for storing the sensor data. The processor circuit further is configured for forwarding the sensor data to the broker device in response to the first device interface circuit having reconnected to the persistent data network following the second device interface circuit having disconnected from the local data connection. The processor circuit further is configured for receiving notification of a credit for forwarding the sensor data.

In another embodiment, one or more non-transitory tangible media are encoded with logic for execution by a machine and when executed by the machine operable for: receiving, by a mobile collector device from a broker device via a persistent data network, a message indicating an instruction for obtaining sensor data originated by one or more isolated sensor devices, the isolated sensor devices not reachable by any wired or wireless infrastructure; establishing, while the mobile collector device is disconnected from the persistent data network and the wired or wireless infrastructure, a local data connection with the one or more isolated sensor devices based on being within proximity thereof; the mobile collector device retrieving and storing the sensor data from the one or more isolated sensor devices via the local data connection based on the message; and the mobile collector device forwarding the sensor data to the broker device in response to having reconnected to the persistent data network following disconnecting from the local data connection, including receiving notification of a credit for forwarding the sensor data.

DETAILED DESCRIPTION

Particular embodiments enable a sensor data broker device in a persistent data network to provide an instruction to direct a user of a mobile collector device (e.g., a smart phone, smart tablet) toward isolated sensor devices that are not reachable by any wired or wireless infrastructure, enabling the mobile collector device to act as a temporary agent for sensor data consumers (i.e., "sensor consumers") unable to reach the isolated sensor devices. The mobile collector device can utilize information from the sensor data broker device to retrieve and store sensor data from the isolated sensor devices upon reaching proximity (e.g., wired or wireless proximity) with the isolated sensor devices. The mobile collector device, upon reconnecting with the wired or wireless infrastructure, can forward the sensor data to the sensor data broker device, enabling the user of the mobile collector device to receive a credit for collecting and forwarding the sensor data on behalf of the sensor consumers.

Hence, the sensor data broker device enables sensor consumers to provide an instruction for directing users of mobile collector devices to obtain sensor data from isolated sensor devices. The instruction can be implemented in the form of an incentive that provides motivation for a user of the mobile collector device to travel within proximity of the isolated sensor devices to collect the sensor data, and then forward the collected sensor data upon reconnection with the wired or wireless infrastructure. The incentive set by one or more of the sensor consumers can vary based on the relative importance of the sensor data and/or the age of the last update of sensor data, or other factors.

The sensor data broker also can output location information identifying at least an identifiable region containing the isolated sensor devices. The location information enables the user of the mobile collector device to locate the isolated sensor devices; the sensor data broker also can announce, within the instruction sent to the mobile collector device, a "treasure hunt" for isolated sensor devices that do not yet have an identified position (e.g., newly deployed sensor devices, sensor devices attached to migratory wildlife, etc.). In some cases certain details of the collected sensor data (e.g., a portion of the sensor data, metadata associated with the sensor data, etc.) also can be displayed on the mobile collector devices, further enhancing a user experience for example in the case of interactive wildlife encounter tours.

FIG. 1 illustrates an example system 10 having a sensor data broker device (SDBD) 12 configured for directing collection of sensor information 14 between a mobile collector device 16 and one or more sensor consumer devices (SCDs) 18, according to an example embodiment. The sensor data broker device 12 is within a persistent data network 20, for example a wired local area network (LAN) and/or wide area network (WAN), for example the Internet. The sensor data broker device 12 can receive a request 22, described below, from one or more of the sensor consumer devices 18 for sensor data from one or more isolated sensor devices 24. Each sensor consumer device 18 can represent a server device of a "sensor consumer", for example an entity or organization that desires retrieval of the sensor data from the isolated sensor devices 24 for commercial or research purposes (e.g., commercial weather forecasting entities, commercial or nonprofit conservancy entities, environmental regulatory agencies, wilderness management agencies, research entities, etc.).

Each isolated sensor device 24 is "isolated" in that the isolated sensor devices 24 are not reachable by any wired or wireless infrastructure 26 provided by a wired or wireless gateway 28 to the persistent data network 20. An isolated sensor device 24 can be "isolated" for various reasons, for example lack of a "long-range" transceiver that can reach any wired or wireless infrastructure 26. An example wired or wireless infrastructure 26 can include a wireless telephony network such as 3G or 4G LTE ("Long Term Evolution") having a gateway 28 providing Internet Protocol (IP) based access between the mobile collector device 16 and the sensor data broker device 12 via a secure data connection 30 (e.g., Transport Layer Security (TLS) and/or HTTPs); the wired or wireless infrastructure 26 also be implemented as a wireless data network such as a Wi-Fi network generated by the wireless gateway 28 (e.g., a wireless access router, wireless access point, etc.). An isolated sensor device 24 could be configured for low-power only operation, including for example low-power wireless transmission using Bluetooth-LE ("low energy") or IEEE 802.15.4; hence, an isolated sensor device 24 could have a wireless proximity range 32 of about ten (10) meters or less.

An isolated sensor device 24 also could be "isolated" if it had a "long-range" transceiver (e.g., 3G or LTE or even satellite transceiver) but was still incapable of establishing any data connection with the wired or wireless infrastructure 26: for example, the wired or wireless infrastructure 26 may have poor wireless coverage at the location occupied by the isolated sensor device 24 that prevents any reliable, consistent, or persistent data connection from being established by the isolated sensor device 24; alternately, even with adequate wireless coverage for establishing a reliable, consistent, or persistent data connection, the isolated sensor device 24 may disable the "long-range" transceiver to minimize costs (e.g., battery consumption cost, monetary data usage cost, etc.) associated with establishing a data connection via the wired or wireless infrastructure 26.

Hence, each sensor consumer device 18 is incapable of reaching any of the isolated sensor devices 24 for any sensor data generated by the isolated sensor device 24 because the isolated sensor devices 18 do not have a reliable, consistent, or persistent data connection with the wired or wireless infrastructure 26.

According to an example embodiment, the sensor data broker device 12 can receive a request 22 from one or more of the sensor consumer devices 18, for example via a secure data connection 30, for sensor data originated by one or more of the isolated sensor devices 24. The request 22 can be in the form of one or more registration requests for a sensor consumer, registration of one or more isolated sensor devices 24 that associate the isolated sensor devices 24 (and/or a sensor consumer identifier associated with a sensor consumer) with the sensor consumer device 18, and/or location information that identifies the last known location(s) (if any) of the isolated sensor devices 24. The request 22 also can identify an incentive that the identified sensor consumer (e.g., "B") is willing to pay for acquisition of the sensor data from an identified isolated sensor device 24.

The sensor data broker device 12 can respond to the request 22 by sending a message 34 (also referred to as a "message sensor incentive message" or "data collection request message") to the mobile collector device 16 indicating the instruction for obtaining the sensor data from one or more of the isolated sensor devices 24. The instruction optionally can specify an incentive for obtaining the sensor data. The sensor incentive message 34 can be sent to the mobile collector device 16, for example, in response to the mobile collector device 16 sending a registration message 36 to the sensor data broker device 12 as part of a user of the mobile collector device 16 registering downloading of an executable application ("Sensor Data Broker App") (52 of FIGS. 4A and 4B) for locating the isolated sensor devices 24.

The sensor incentive message 34 sent to the mobile collector device 16 by the sensor data broker device 12 in response to the registration message 36 can enable the "Sensor Data Broker App" 52 executed in the mobile collector device 16 to direct the user of the mobile collector device 16 to locate isolated sensor devices 24 that are either within a determined distance of the mobile collector device 16, or along a prescribed path (e.g., the Appalachian Trail). In particular, the sensor incentive message 34 can identify the incentive for each isolated sensor device 24, and optionally can identify a last known location or region of the isolated sensor device 24; alternately, the sensor incentive message 34 can identify that an incentive is part of a "treasure hunt" for an isolated sensor device 24 having an unknown location. The sensor incentive message 34 also can include secure communication parameters enabling the "Sensor Data Broker App" 52 executed in the mobile collector device 16 to establish a secure data connection with an isolated sensor device 24 as the mobile collector device 16 moves within the wireless proximity range 32 of the isolated sensor device 24. Hence, the sensor data broker app 52 can establish secure communications with the isolated sensor device 24 even if the user of the mobile collector device 16 is an untrusted third party.

Hence, the mobile collector device 16 can retrieve and store sensor data from each isolated sensor device 24 within wireless proximity range 32 as the user of the mobile collector device 16 travels along a path 38 while the mobile collector device 16 is disconnected from the persistent data network 20 and the wired or wireless infrastructure 26. Upon returning to the coverage area of the same wired or wireless infrastructure 26 or a different wired or wireless infrastructure 26' at event 40, the mobile collector device 16 can reconnect to the wired or wireless infrastructure 26 or 26' and the persistent data network 20, and forward the sensor information 14 (containing sensor data, sensor metadata, and collection metadata) to the sensor data broker device 12. The sensor data broker device 12, in response to receiving the sensor information 14, can cause the sensor consumer device 18 to obtain the sensor information 14 (including the sensor data), and can send to the mobile collector device 16 a credit message 42 indicating the user of the mobile collector device 16 has been sent a credit for forwarding the collected sensor information 14 to the sensor data broker device 12; the credit optionally can be contingent on the sensor data broker device 12 receiving an acknowledgement of the sensor consumer device 18 having received the sensor information 14 (or at least the sensor data).

Hence, the example embodiments enable the sensor data broker device 12 to direct a user of a mobile collector device 16 toward sensor consumer devices 18 for collection of sensor information 14 on behalf of one or more sensor consumer devices 18 that cannot reach the isolated sensor devices 24. The users can be directed based on location information transmitted in the sensor incentive message 34 sent to the mobile collector device 16, and/or varying incentives identified for each isolated sensor device 24. The incentives can be various forms, for example cash-based incentives, "points" based incentives (e.g., airline mileage points, club points, vendor points or "virtual dollars", reputation points in social organizations or gaming systems, etc.), or other credit schemes.

Figure 2:
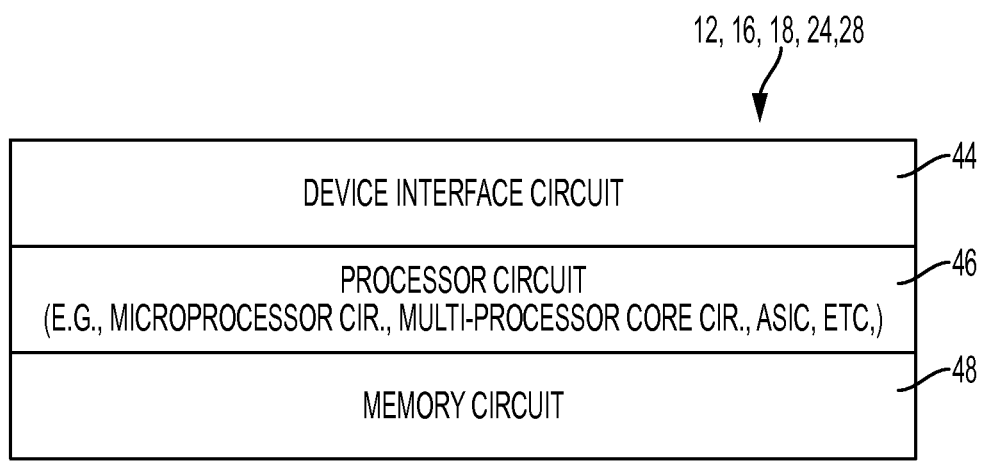
FIG. 2 illustrates an example implementation of any one of the sensor data broker device, the mobile collector device, and/or the sensor consumer devices of FIG. 1, according to an example embodiment.

FIG. 2 illustrates an example implementation of any one of the devices 12, 16, 18, 24, and/or 28 of FIG. 1, according to an example embodiment. Each device 12, 16, 18, 24, and/or 28 is an apparatus implemented as a physical machine (i.e., a hardware device) configured for network-based communications with another physical machine. The term "configured for" or "configured to" as used herein with respect to a specified operation refers to a device and/or machine that is physically constructed and arranged to perform the specified operation.

Each apparatus 12, 16, 18, 24, and/or 28 can include a device interface circuit 44, a processor circuit 46, and a memory circuit 48. Depending on implementation, the device interface circuit 44 can include one or more distinct physical layer transceivers for communication with any one of the other devices 12, 16, 18, and/or 24; for example, the device interface circuit 44 of an isolated sensor device 24 can include a transceiver for low power communications using Bluetooth-LE and/or IEEE 802.15.4; in contrast, the mobile collector device 16 can include a first device interface circuit 44a (FIG. 4A) for low power communications with the isolated sensor device 24, a second device interface circuit 44b (e.g., 3G or 4G LTE) for communications in the wired or wireless infrastructure 26, a third Wi-Fi transceiver circuit 44c for Wi-Fi communications in the wired or wireless infrastructure 26, and a fourth GPS receiver circuit 44d for reception of GPS signals. The mobile collector device 16 also can include other transceivers (e.g., a universal serial bus (USB) transceiver, etc.).

The device interface circuit 44 of the wireless gateway 28 can include a first transceiver for wireless communications with the mobile collector device 16 (e.g., via the device interface circuit 44b and/or the Wi-Fi transceiver circuit 44c), and an IEEE based Ethernet transceiver for communications with the devices 12 and/or 18 in the persistent data network 20. Any of the devices 12, 18, or 28 also can include a transceiver for communications via a wired or wireless link, an optical link, etc.).

The processor circuit 46 can be configured for executing any of the operations described herein, and the memory circuit 48 can be configured for storing any data or data packets as described herein. Although not shown in FIG. 2, each of the devices 12, 16, 18, 24, and/or 28 can include a power source such as a rechargeable battery, etc.

Any of the disclosed circuits of the devices 12, 16, 18, 24, and/or 28 (including the device interface circuit 44, the processor circuit 46, the memory circuit 48, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 48) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 48 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 48 can be implemented dynamically by the processor circuit 46, for example based on memory address assignment and partitioning executed by the processor circuit 46.

Figure 3A:
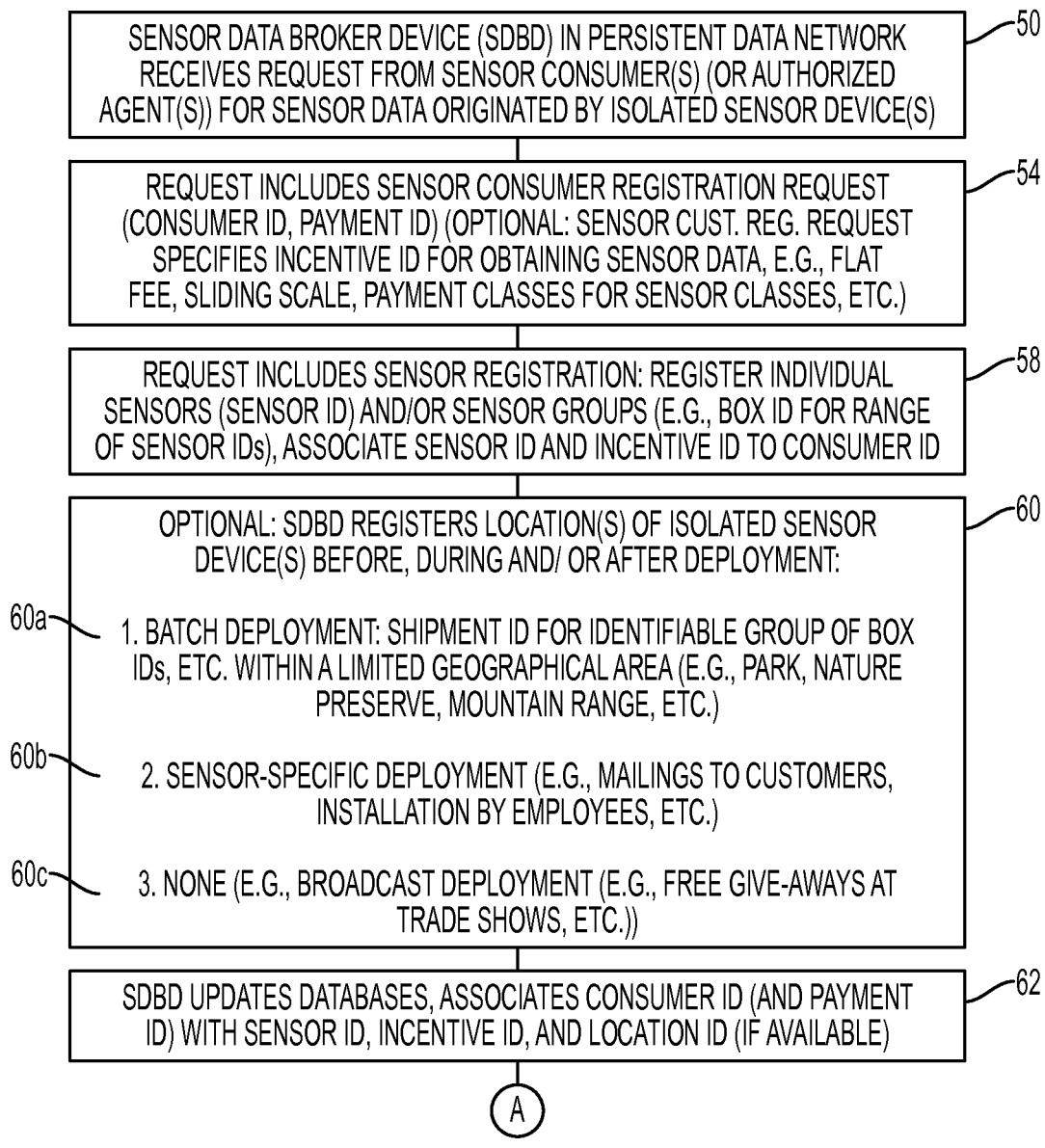
FIGS. 3A, 3B, and 3C illustrate an example method summarizing the directed collection of sensor data by the mobile collector device from isolated sensor devices, and delivery of the sensor data by the mobile collector device to the data broker device for the sensor consumer devices, according to an example embodiment.
Figure 3B:
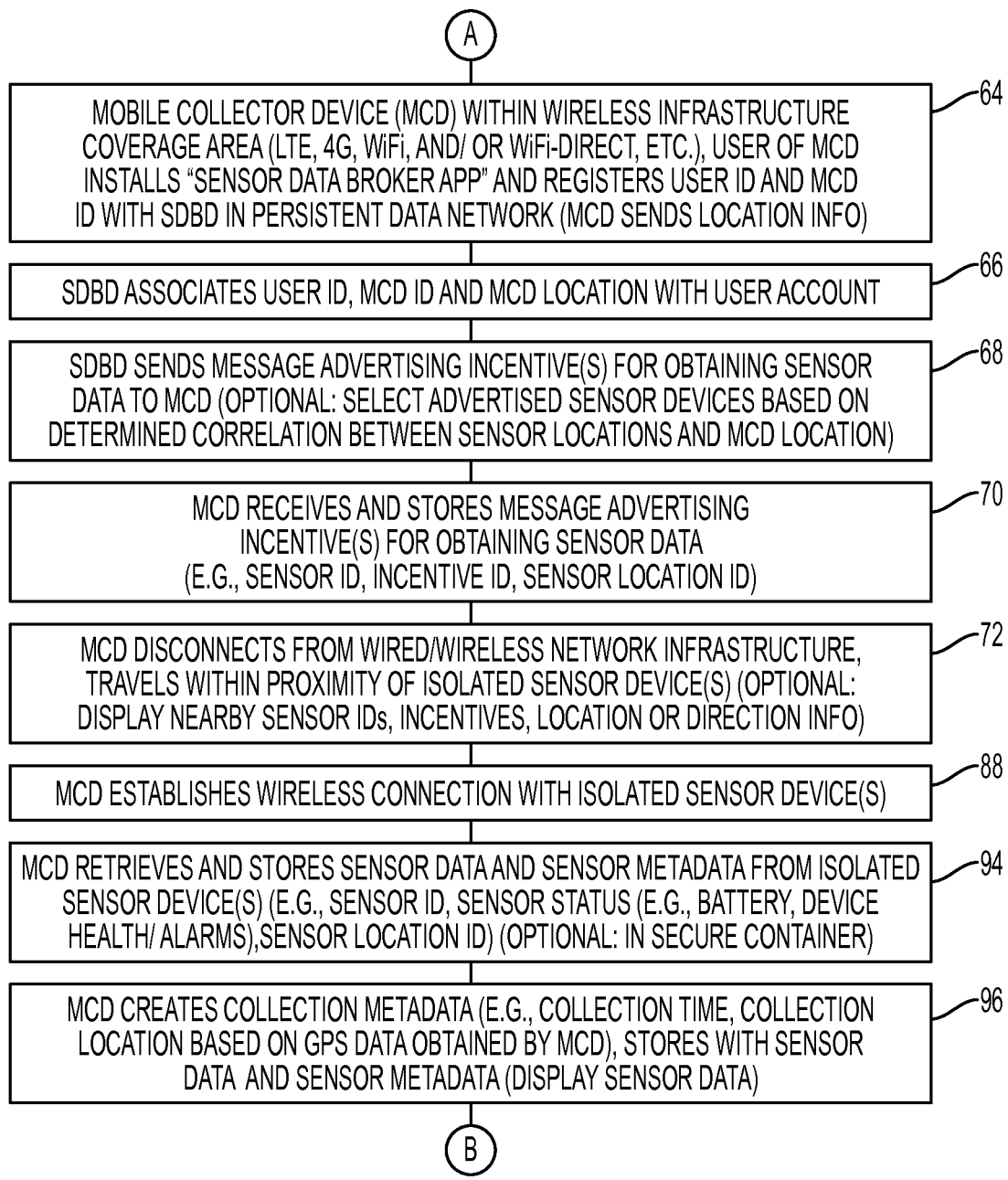
Figure 3C:
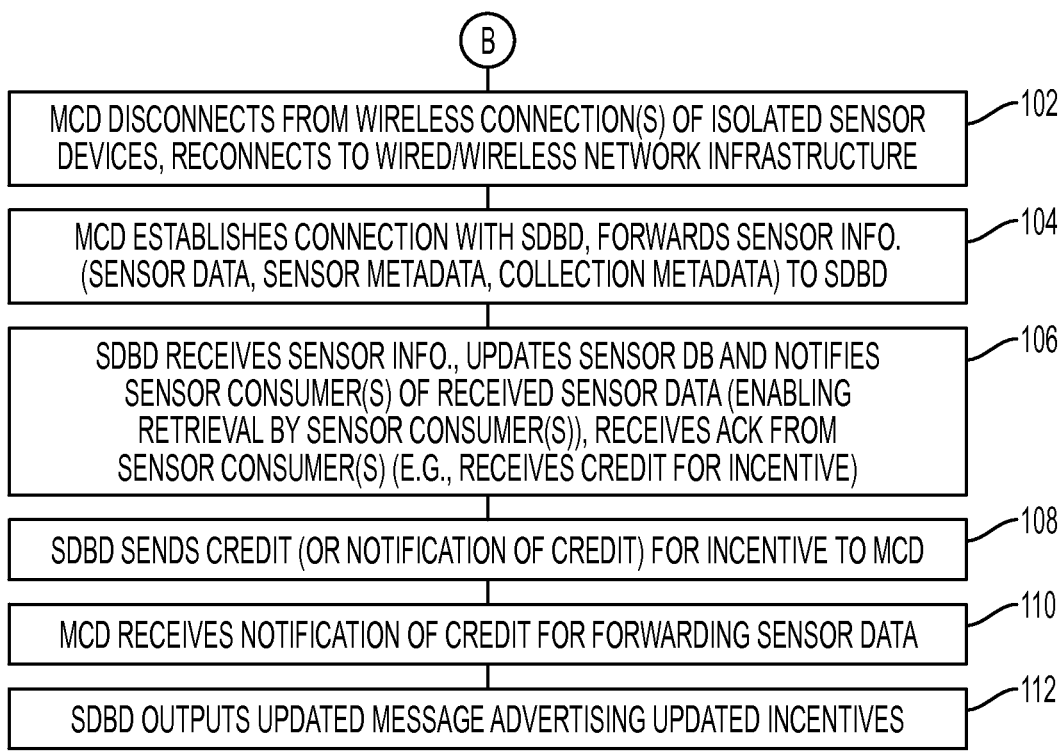

FIGS. 3A, 3B, and 3C illustrate an example method summarizing the directed collection of sensor data by the mobile collector device 16 from isolated sensor devices 24, and delivery of the sensor data by the mobile collector device 16 to the data broker device 12 for the sensor consumer devices 18, according to an example embodiment.

The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to operation 50 of FIG. 3A, the device interface circuit 44 of the sensor data broker device 12 is configured for receiving, in the persistent data network 20, a request 22 from one or more of the sensor consumer devices 18. The request 22 also can be sent by an authorized agent acting on behalf of a given sensor consumer. For example, a sensor consumer device 18 (e.g., sensor consumer "A") can be interested in obtaining its own proprietary and private sensor data from isolated sensor devices 24 that are deployed on behalf of the sensor consumer "A". Alternately, a sensor consumer device 18 (e.g., sensor consumer "B") can be interested in obtaining sensor data from isolated sensor devices 24 that can be publicly advertised as available for collecting data; for example, the sensor consumer "B" (e.g. a public company, utility, or government agency) can advertise availability of the isolated sensor devices 24 to encourage a user of a mobile collector device 16 to download a "Sensor Data Broker App" (52 of FIGS. 4A and 4B) for locating the isolated sensor devices 24 and retrieving the associated sensor data; the sensor consumer "B" also can encourage participation by another sensor consumer "C" interested in consuming the sensor data, where the sensor consumer can contribute in offering an incentive for acquiring the sensor data from the isolated sensor devices 24.

Hence, one or more sensor consumer devices 18 associated with one or more sensor consumers (e.g., "A", "B", and/or "C") can send respective requests 22, received by the device interface circuit 44 of the sensor data broker device 12 via the persistent data network 20, for the sensor data originated by one or more of the isolated sensor devices 24 that are not reachable by the wired or wireless infrastructure 26.

In response to receiving the request 22, the processor circuit 46 of the sensor data broker device 12 in operation 54 is configured for performing consumer registration in response to parsing the request 22. For example, the processor circuit 46 of the sensor data broker device 12 can determine that the request 22 includes a consumer registration request for a new consumer, enabling the processor circuit 46 of the sensor data broker device 12 to register the sensor consumer "B" of the sensor consumer device 18 as a new sensor consumer with a new consumer ID (e.g., Consumer ID=B) having a prescribed payment identifier (e.g., Payment ID=Acct_B) for issuing credits for incentives upon receipt of sensor data. As described previously, the payment identifier can be used for issuing credits for various types of incentives, for example cash-based incentives, "points" based incentives (e.g., airline mileage points, club points, vendor points or "virtual dollars", reputation points in social organizations or gaming systems, etc.), or other credit schemes.

The processor circuit 46 in operation 54 can create a database entry (e.g., a consumer entry) in a sensor database (56 of FIG. 1) that associates the consumer identifier, corresponding payment identifier, and address of the sensor consumer device 18 (e.g., Consumer ID="B", Payment ID=Acct_B"; IPv6=ABCD::B000). The sensor database 56 can be internal database stored within the memory circuit 48 of the sensor data broker device 12, or an external database that is stored within another machine directly connected to the sensor data broker device 12 or reachable via a local or wide area network connection. The request 22 from the same sensor consumer device 18 (or a separate request message 22 from a different sensor consumer device 18 associated with the consumer) also can specify one or more incentive indicators (i.e., incentive identifiers) that identify an incentive for obtaining the sensor data from one or more of the isolated sensor device 24. For example, a cash-based incentive can specify a flat fee for a single isolated sensor device 24 or a prescribed group of isolated sensor devices 24, a sliding scale based on the amount of time that has lapsed since sensor data was last collected, different payment classes for different sensor classes. For example, a given area such as a ten thousand acre wilderness management area may have various classes of isolated sensor devices 24, such as: weather class for water temperature/water level sensor devices, ambient air temperature/humidity sensor devices, wind speed and/or direction; seismic class for seismic sensor devices; remote traffic class for pneumatic road tube sensor devices; wildlife migration class sensor devices attached to for migratory wildlife, etc.).

The request 22 from the same sensor consumer device 18 (or a separate request message 22 from a different sensor consumer device 18 associated with the consumer) also can specify sensor registration information. For example, the same request 22 received in operation 50 also can specify one or more isolated sensor device 24 for sensor registration; the isolated sensor devices 24 also can be registered separately from the consumer registration, for example in the case of sensor deployment following the consumer registration in operations 50 and 54, where the device interface circuit 44 of the sensor data broker device 12 receives in operation 58 a sensor registration request message for registration of newly-deployed isolated sensor devices 24. The request 22 can specify individual sensor devices based on sensor identifier (Sensor ID), for example a unique Bluetooth-LE address used by the corresponding isolated sensor device 24; the request 22 also can specify one or more sensor group identifiers, for example a box identifier (Box ID) generated by a sensor manufacturer that can associate the box identifier with a prescribed range of sensor identifiers. If the sensor registration information is received in a sensor registration request message distinct from the initial request 22 for sensor consumer registration, the sensor registration request message also can identify one or more sensor consumers (e.g., "B").

Hence, the processor circuit 46 in operation 58 can create or update a sensor entry in the sensor database 56 that associates the sensor identifier and incentive indicator of each isolated sensor device 24 with one or more consumer identifiers (e.g., "B") of sensor consumers that participate in providing an incentive for obtaining the corresponding sensor data.

The processor circuit 46 of the sensor data broker device 12 in operation 62 is configured for updating one or more of the sensor entries in the sensor database 56 in response to the device interface circuit 44 receiving in operation 60 any new or updated location information received from any sensor consumer device 18 and/or any mobile collector device 16 having collected sensor data. The request 22 and/or the subsequently-received sensor registration message can optionally specify location information for one or more of the isolated sensor device 24 that enables the processor circuit 46 in operation 60 to register location information for the path 38 before, during, or after deployment.

In one example, the device interface circuit 44 in operation 60a can receive one or more of the sensor entries in the sensor database 56 in response to receiving a shipment identifier (Shipment ID) for an identifiable group of box identifiers (Box IDs), enabling the processor circuit 46 of the sensor data broker device 12 to identify in operation 62 the isolated sensor devices 24 based on accessing the sensor manufacturer (or distributor) to determine the range of sensor identifiers based on the box identifier; the location information can be based on the shipment identifier indicating shipment (or deployment) to a prescribed destination, for example an identifier park, nature preserve, mountain range, etc.

In another example, the device interface circuit 44 in operation 60b can receive sensor-specific location information in response to specific sensor deployment; for example, rural customers (residential customers of a heating oil company) of a sensor consumer "B" of the sensor consumer device 18 can respond to a mass mailing of sensor devices by posting an isolated sensor device 24 on their property (e.g., a temperature sensor), where a rural customer having received an isolated sensor device 24 can call a prescribed toll-free number assigned to sensor consumer "B" and enter their customer identifier and sensor identifier, enabling the sensor consumer "B" to associate the rural customer address as the sensor location for the identified isolated sensor device 24. Alternately, an employee of the sensor consumer "B" can input one or more location identifiers for installed isolated sensor device 24 following deployment by the employee. In another example (60c), no location information may be initially available, for example in the case of a "broadcast deployment" involving a free give-away at a trade show or another public venue, or deployment based on depositing the isolated sensor devices 24 as floating sensor devices within a moving body of water such as a river.

At a minimum, the processor circuit 46 of the sensor data broker device 12 in operation 62 can update the sensor database 56 to associate a consumer entry (specifying consumer identifier and payment identifier of a sensor consumer of a sensor consumer device 18 with one or more sensor entries (specifying at least a sensor identifier and payment identifier). If available, the processor circuit 46 also updates a sensor entry to include a location identifier that identifies the location information for the sensor; as apparent from the foregoing, the initial location identifier may either be nonexistent or for a very large geographic region, such as a ten thousand acre wilderness management area. Hence, the processor circuit 46 of the sensor data broker device 12 can associate at least a first of the sensor consumers "B" with requesting the sensor data from the isolated sensor devices 24 within an identifiable region (based on the location information), for the incentive identified by the incentive indicator.

Referring to FIG. 3B, the user of a mobile collector device 16 can cause the processor circuit 46 to download and install in operation 64 a sensor data broker app 52 while the mobile collector device 16 is within the wired or wireless infrastructure 26, enabling the mobile collector device 16 to reach a download server (e.g., sensor data broker device 12 or other server) providing the sensor data broker app 52. The processor circuit 46 executing the sensor data broker app 52 in the mobile collector device 16 can generate a registration message 36 that identifies the user (by user identifier) and the mobile collector device 16 (by MCD identifier such as allocated telephone number and/or IP address); the device interface circuit 44b and/or the Wi-Fi transceiver circuit 44c of the mobile collector device 16 can output the registration message 36 while within the coverage area of the wired or wireless infrastructure 26, enabling the device interface circuit 44 of the sensor data broker device 12 to receive the registration message 36 via the persistent data network 20. The registration message 36 also can optionally include location information, for example based on an IP address of the wireless gateway 28 providing the wired or wireless infrastructure 26, and/or GPS coordinates detected by the GPS receiver circuit 44d of the wired or wireless infrastructure 26.

In response to the device interface circuit 44 of the sensor data broker device 12 receiving the registration message 36, the processor circuit 46 of the sensor data broker device 12 in operation 66 can create or update a user entry in the sensor database 56 that associates the user identifier, MCD identifier, (and optionally MCD location) with an identifiable user account established for receiving incentive credits.

In response to the request 22, the processor circuit 46 of the sensor data broker device 12 can generate and send in operation 68 a message 34 (i.e., the sensor incentive message) to the mobile collector device 16 via the persistent data network 20 and the wired or wireless infrastructure 26. The processor circuit 46 of the sensor data broker device 12 can send the sensor incentive message 34 to the mobile collector device 16 in response to registration of the mobile collector device 16 in operation 66; the sensor incentive message 34 also can be sent without registration by the mobile collector device 16, for example in response to the mobile collector device 16 accessing an advertised website listing the availability of incentives and/or locations of the isolated sensor devices 24, etc. Hence, the user registration also can be executed following collection of sensor data, described below.

Assuming the sensor data broker device 12 receives location information about the mobile collector device 16, the processor circuit 46 of the sensor data broker device 12 also can select from among the available isolated sensor device 24 identified in the sensor database 56 based on a determined correlation between the determined location of the mobile collector device 16 and the respective identified locations of the isolated sensor device 24. For example, the processor circuit 46 can limit the identification of the isolated sensor device 24 to sensor devices to within a prescribed distance, for example within a two hundred (200) mile radius of the current location of the mobile collector device 16 within the wired or wireless infrastructure 26; other "filters" can be applied to limit the identification of the isolated sensor device 24, for example sensor type, user type (public user, employee, etc.), user interest (e.g., hiker, fisherman, hunter, bird watcher, botanist, etc.). The sensor incentive message 34 also can specify one or more isolated sensor devices 24 having unknown sensor locations that can be advertised as part of a "treasure hunt", where the incentive can have a corresponding higher "treasure hunt" value.

In response to the device interface circuit 44 (e.g., 44b, 44c and/or a USB transceiver) of the mobile collector device 16 in operation 70 receiving the sensor incentive message 34, the processor circuit 46 of the mobile collector device 16 can store the instructions from the received sensor incentive message 34 in the memory circuit 48 of the mobile collector device 16, including for example sensor identifier, incentive indicator, and/or optionally sensor location identifier). The storage of the information in the sensor incentive message 34 in the memory circuit 48 enables the mobile collector device 16 in operation 72 to disconnect from the wired or wireless infrastructure 26, for example as the user of the mobile collector device 16 travels to a remote location containing the isolated sensor devices 24, for example a segment of the Appalachian Trail spanning approximately 2,200 miles across Georgia to Maine. Although disconnected from the wired or wireless infrastructure 26, the mobile collector device 16 can detect GPS signals via its GPS receiver circuit 44d, enabling the sensor data broker app 52 executed by the processor circuit 46 to display nearby isolated sensor devices 24 as the mobile collector device 16 moves along a path 38 containing identifiable isolated sensor devices 24.

Figure 4A:
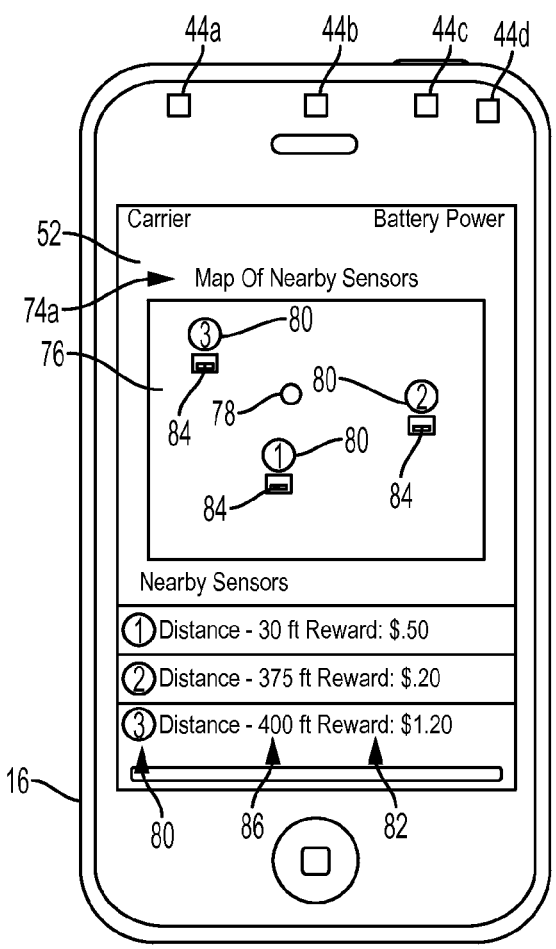
FIGS. 4A and 4B illustrate example displays by the mobile collector device for collection of the sensor data from the isolated sensor devices of FIG. 1, according to an example embodiment.

FIG. 4A illustrates an example execution state 74a of the sensor data broker app 52 executed by the mobile collector device 16 while disconnected from the wireless gateway 28, according to an example embodiment. The execution state 74a illustrates a map 76 of nearby isolated sensor devices 24, relative to a current detected position 78, based on the sensor information from the received sensor incentive message 34 and stored in the memory circuit 48. The processor circuit 46 executing the sensor data broker app 52 can display for each isolated sensor device 24 as part of the execution state 74a, based on the stored sensor incentive message 34, a corresponding sensor identifier 80, a corresponding incentive indicator 82, location information in the form of a corresponding identified sensor location 84, and/or corresponding direction information 86 for reaching the corresponding isolated sensor device 24.

The processor circuit 46 of the mobile collector device 16 can determine the current detected position 78 displayed in the map 76 based on GPS signals received from the GPS receiver circuit 44d. The displayed sensor identifier 80 can be a "true" identifier assigned by the sensor consumer device 18 (e.g., "EPA#16552" illustrated in FIG. 4B), or a "logical" identifier assigned by the execution state 74a (e.g., The numerical identifiers "1", "2", "3"), as appropriate. The incentive indicator 82, which indicates an incentive for obtaining the sensor data originated by the corresponding identified isolated sensor device 24, can be displayed in various forms based on the incentive type, for example currency ("$1.20" for one dollar and twenty cents), or number of "points", "miles", "game credits", etc. The identified sensor location 84 can be illustrated as a sensor icon on the map 76. The direction information 86 can specify information for locating the isolated sensor device 24 relative to the current detected position 78, for example distance and/or direction based on any appropriate vector-based coordinate system (e.g., 30 feet at 190 degrees true for sensor "1"; 375 feet at 90 degrees true for sensor "2"; 400 feet at 310 degrees true for sensor "3") or map-based system (e.g., 30 feet on trail #1 for sensor "1"; 375 feet at trail #2 for sensor "2"; 400 feet on trail #7 for sensor "3"). Hence, the execution state 74a generating the map 76 of identified sensor locations 84 enables the mobile collector device 16 to direct a user toward the identified isolated sensor devices 24.

The mobile collector device 16 in operation establishes a local data connection with one or more isolated sensor devices 24, for example a wired (e.g., USB) connection or a wireless connection (e.g., Bluetooth or Wi-Fi, or infrared). For example, the low-power device interface circuit 44a of the mobile collector device 16 in operation 88 can detect an isolated sensor device 24 as the mobile collector device 16 moves within wireless proximity range 32 of the isolated sensor device 24, and the low-power device interface circuit 44a in response can establish a wireless connection with one or more isolated sensor devices 24 (e.g., sensor "1"—"EPA16552") while within the wireless proximity range 32. The processor circuit 46 of the mobile collector device 16 can respond to the wireless connection by retrieving stored sensor data 90 and optionally sensor metadata 92 from the isolated sensor device 24 (e.g., sensor "1"—"EPA16552"). The sensor data 90 and/or the sensor metadata 92 can be stored within a secure data container or "secure container" (e.g., encrypted within the secure data container) that is otherwise inaccessible by the mobile collector device 16; alternately, a portion of the sensor data 90 and/or the sensor metadata 92 can be unencrypted, enabling the processor circuit 46 of the mobile collector device 16 to display the unsecured portions of the sensor data 90 or the sensor metadata 92 for use and enjoyment of the user of the mobile collector device 16, as illustrated in FIG. 4B.

Figure 4B:
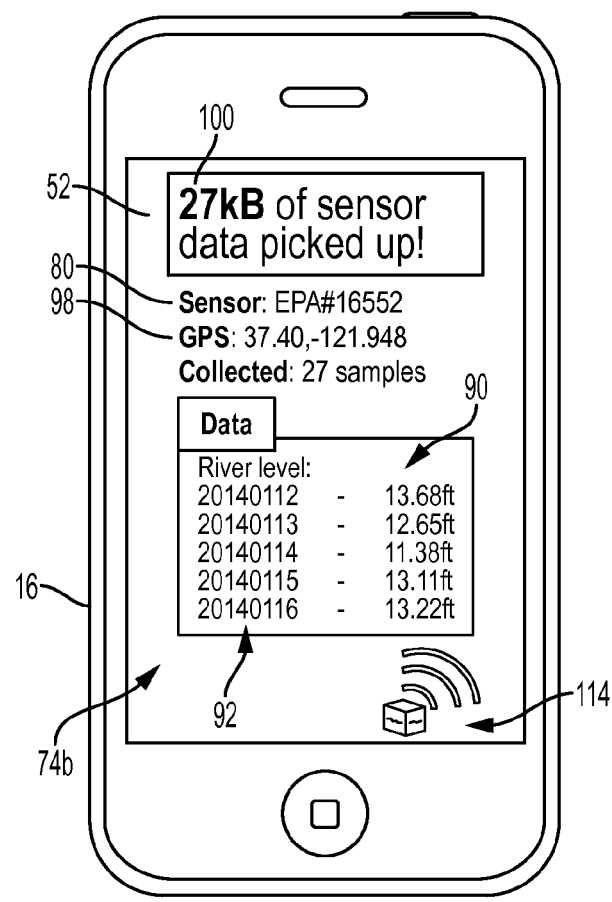

The processor circuit 46 of the mobile collector device 16 in operation 94 can store the received sensor data 90 and sensor metadata 92 in the memory circuit 48 of the mobile collector device 16 and generate an execution state 74b in FIG. 4B that can selectively display an sensor data 90 or sensor metadata 92 that includes a "sensor pickup" icon 114 and that provides visual notification of receiving sensor data from an isolated sensor device 24 identified by its sensor identifier 80. Other sensor metadata generated by the isolated sensor device 24 can be received from the isolated sensor device 24 by the mobile collector device 16, including for example sensor identifier (e.g., "EPA16552" 80 of FIG. 4B), sensor detection time, sensor status (e.g., battery level, device health or device alarms, sensor location identifier as determined by isolated sensor device 24), etc. As illustrated in FIG. 4B, the sensor data 90 illustrates river height levels (in feet) with the sensor metadata 92 illustrating respective sensor detection times (by year, month, and date).

In response to receiving the sensor data 90 and the sensor metadata 92 from the isolated sensor device 24 in operation 94, the processor circuit 46 of the mobile collector device 16 in operation 96 can create collection metadata associated with the collection or retrieving of the sensor data 90 and sensor metadata 92 from the corresponding isolated sensor device 24: example collection metadata can include collection time and/or collection location 98 based on the GPS signals received by the GPS receiver circuit 44d, collected data size 100, user identifier (User ID) for the user of the mobile collector device 16, etc. The processor circuit 46 in operation 96 can store the collection metadata with the sensor data 90 and sensor metadata 92 associated with the connection with the corresponding isolated sensor device 24. Hence, in operation 96 the sensor data 90, the sensor metadata 92, and the collection metadata can be stored in the memory circuit 48 by the execution state 74a, on a per-sensor device basis.

The overall interaction of the mobile collector device 16 with the isolated sensor device 24 can be under the control of the sensor data broker app 52 executed by the processor circuit 46 in operations 88, 94, and 96. The operations 72, 88, 94, and 96 can be repeated for each isolated sensor device 24 as the user travels along the path 38.

Referring to FIG. 1 and FIG. 3C, the mobile collector device 16 can forward the sensor information 14 for one or more of the isolated sensor devices 24 (including the sensor data 90, sensor metadata 92, and collection metadata stored in the memory circuit 48) after having traveled the path 38, disconnecting from all the isolated sensor devices 24, and reconnecting to a wired or wireless infrastructure 26 or 26' at event 40. In particular, the device interface circuit 44b or 44c of the mobile collector device 16 can detect the wired or wireless infrastructure 26 or 26', and in response reconnect to the wired or wireless infrastructure 26 in operation 102 to establish reachability to the sensor data broker device 12. The sensor data broker app 52 executed by the processor circuit 46 in operation 104 can establish a secure data connection 30 with the sensor data broker device 12, and forward the sensor information 14 for all the isolated sensor devices 24 detected along the path 38.

In response to the device interface circuit 44 of the sensor data broker device 12 receiving the sensor information 14 from the sensor data broker app 52 executed in the mobile collector device 16, the processor circuit 46 of the sensor data broker device 12 in operation 106 can update the sensor entries in the sensor database 56 with the sensor data 90, sensor metadata 92, and collection data, including for example updating the sensor location based on the collection location 98, and updating the collection time based on the collection metadata collected in operation 96. The processor circuit 46 of the sensor data broker device 12 in operation 106 also can cause one or more of the sensor consumer devices 18 to obtain any portion of the sensor information 14 stored in the sensor database 56 for one or more of the isolated sensor devices 24 (e.g., the sensor data 90, the sensor metadata 92, and/or the collection metadata), for example based on sending a notification that the sensor entries for respective identified isolated sensor devices 24 have been updated. One or more of the sensor consumer devices 18 (e.g., "B") can respond to the notification by retrieving the sensor information 14 for one or more of the identified isolated sensor devices 24 from the 56, for example as part of a database update that includes the sensor consumer device 18 and/or the sensor database 56 generating an acknowledgement that the sensor consumer device 18 has received the sensor information 14 including the sensor data 90, the sensor metadata 92 and/or the collection metadata.

In response to the processor circuit 46 of the sensor data broker device 12 detecting in operation 106 an acknowledgement (e.g., from the sensor consumer device 18) that the sensor consumer device 18 has obtained the sensor information 14 (including the sensor data 90, the sensor metadata 92 and/or the collection metadata), the processor circuit 46 of the sensor data broker device 12 in operation 108 can send a credit message 42 to the mobile collector device 16 via the persistent data network 20 and the wired or wireless infrastructure 26 or 26'; alternately, the processor circuit 46 of the sensor data broker device 12 can output the credit message 42 in operation 108 in response to detecting the sensor data broker device 12 has received the sensor information 14, without the necessity of any communication the sensor consumer device 18 (e.g., no acknowledgement needed from the sensor consumer device 18).

In response to the device interface circuit 44 of the mobile collector device 16 receiving in operation 110 the notification of credit for the one or more incentives based on forwarding the sensor information 14, the sensor data broker app 52 executed by the mobile collector device 16 can display that the user of the mobile collector device 16 has been issued a credit for the one or more incentives associated with the isolated sensor devices 24 detected by the mobile collector device 16 along the path 38. The processor circuit 46 of the sensor data broker device 12 in operation 112 also can respond to the update of the sensor entries in the sensor database 56 by outputting updated sensor incentive messages 34 advertising updated incentives based on the updated locations and/or updated collection times.

According to example embodiments, users of mobile collector devices can be directed toward isolated sensor devices based on sensor incentive messages output from a sensor data broker device on behalf of sensor consumer devices that are unable to access the isolated sensor devices via any wired or wireless network connection. Hence owners or managers of the isolated sensor devices can cause the sensor data broker device to advertise incentives to owners of mobile collector devices, enabling a scalable merging of IoT based technology with wide area network-based technology based on directed collection of sensor data using secured collection between the mobile collector devices and the isolated sensor devices, even if the owners of the mobile collector devices are untrusted third parties. Since the users of the mobile collector devices may be untrusted third parties, the sensor information (or any portion thereof) can be transported in secure data containers that can protect privacy for the sensor information and/or maintain data integrity for the sensor information. The example embodiments can provide an accelerated acquisition of sensor information from IoT sensor devices deployed worldwide that eliminates the necessity of dedicated data acquisition personnel.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   receiving, by a broker device in a persistent data network, a request from one or more sensor consumers for sensor data originated by one or more isolated sensor devices, the isolated sensor devices not reachable by any wired or wireless infrastructure;
   sending, by the broker device via the persistent data network in response to the request, a message to a mobile collector device indicating an instruction for obtaining the sensor data from the one or more isolated sensor devices; and
   receiving, by the broker device in the persistent data network, the sensor data from the mobile collector device having established a local data connection with the one or more isolated sensor devices, and in response causing sending of a credit for receiving the sensor data to a registered user of the mobile collector device; wherein:
   the request includes a registration request for an identified first of the sensor consumers to receive the sensor data, an incentive indicator that identifies an incentive for obtaining the sensor data, and location information identifying at least an identifiable region containing the isolated sensor devices;
   the instruction in the message specifies the incentive for obtaining the sensor data; and
   the method further comprising the broker device associating the first of the sensor consumers with requesting the sensor data from the isolated sensor devices within the identifiable region, for the incentive identified by the incentive indicator.

2. The method of claim 1, further comprising:
   causing the one or more sensor consumers to obtain the sensor data received from the mobile collector device; and
   sending the credit for receiving the sensor data in response to receiving acknowledgement of the one or more sensor consumers having obtained the sensor data.

3. The method of claim 1, wherein:
   the receiving from the mobile collector device includes receiving collection metadata associated with the sensor data, the collection metadata identifying a collection time and a collection location for a corresponding identified isolated sensor device; and
   the method further comprising updating a sensor entry for the identified isolated sensor device to specify the collection time and the collection location, and outputting an updated message indicating an updated incentive for obtaining updated sensor data from the identified sensor device based on the collection location.

4. The method of claim 1, wherein:
   the receiving of the request includes receiving a sensor registration request identifying deployment of the one or more isolated sensor devices, on behalf of the first of the sensor consumers, at respective one or more identified locations; and
   the method further comprising associating the isolated sensor devices at the respective identified locations with the first of the sensor consumers, the message to the mobile collector device specifying the identified locations for the respective isolated sensor devices.

5. The method of claim 4, further comprising selecting the one or more isolated sensor devices for identification in the message based on a determined correlation between a determined location of the mobile collector device and the respective identified locations of the isolated sensor devices.

6. An apparatus comprising:
   a device interface circuit configured for receiving, in a persistent data network, a request from one or more sensor consumers for sensor data originated by one or more isolated sensor devices, the isolated sensor devices not reachable by any wired or wireless infrastructure; and a processor circuit configured for generating and sending, in response to the request, a message to a mobile collector device indicating an instruction for obtaining the sensor data from the one or more isolated sensor devices;

the device interface circuit further configured for receiving, via the persistent data network, the sensor data from the mobile collector device having established a local data connection with the one or more isolated sensor devices;

the processor circuit further configured for causing sending of a credit for receiving the sensor data, to a registered user of the mobile collector device, in response to reception of the sensor data, wherein:

the request includes a registration request for an identified first of the sensor consumers to receive the sensor data, an incentive indicator that identifies an incentive for obtaining the sensor data, and location information identifying at least an identifiable region containing the isolated sensor devices;

the instruction in the message specifies the incentive for obtaining the sensor data; and the processor circuit further configured for associating the first of the sensor consumers with requesting the sensor data from the isolated sensor devices within the identifiable region, for the incentive identified by the incentive indicator.

7. The apparatus of claim 6, wherein:

the processor circuit is configured for causing the one or more sensor consumers to obtain the sensor data received from the mobile collector device; and the processor circuit further configured for sending the credit for receiving the sensor data in response to receiving acknowledgement of the one or more sensor consumers having obtained the sensor data.

8. The apparatus of claim 6, wherein:

the device interface circuit is configured for receiving, from the mobile collector device, collection metadata associated with the sensor data, the collection metadata identifying a collection time and a collection location for a corresponding identified isolated sensor device; and the processor circuit further configured for updating a sensor entry for the identified isolated sensor device to specify the collection time and the collection location, and further configured for outputting an updated message indicating an updated incentive for obtaining updated sensor data from the identified sensor device based on the collection location.

9. The apparatus of claim 6, wherein:

the device interface circuit is further configured for receiving a sensor registration request identifying deployment of the one or more isolated sensor devices, on behalf of the first of the sensor consumers, at respective one or more identified locations; and the processor circuit is further configured for associating the isolated sensor devices at the respective identified locations with the first of the sensor consumers, the processor circuit further configured for specifying, within the message to the mobile collector device, the identified locations for the respective isolated sensor devices.

10. One or more non-transitory media encoded with logic for execution by a machine and when executed by the machine operable for:

receiving, by a device in a persistent data network, a request from one or more sensor consumers for sensor data originated by one or more isolated sensor devices, the isolated sensor devices not reachable by any wired or wireless infrastructure;

sending, by the device via the persistent data network in response to the request, a message to a mobile collector device indicating an instruction for obtaining the sensor data from the one or more isolated sensor devices; and receiving, by the device in the persistent data network, the sensor data from the mobile collector device having established a local data connection with the one or more isolated sensor devices, and in response causing sending of a credit for receiving the sensor data to a registered user of the mobile collector device; wherein:

the request includes a registration request for an identified first of the sensor consumers to receive the sensor data, an incentive indicator that identifies an incentive for obtaining the sensor data, and location information identifying at least an identifiable region containing the isolated sensor devices;

the instruction in the message specifies the incentive for obtaining the sensor data; and the one or more non-transitory media when executed further operable for the device associating the first of the sensor consumers with requesting the sensor data from the isolated sensor devices within the identifiable region, for the incentive identified by the incentive indicator.

11. The one or more non-transitory media of claim 10, wherein: the receiving from the mobile collector device includes receiving collection metadata associated with the sensor data, the collection metadata identifying a collection time and a collection location for a corresponding identified isolated sensor device; and the non-transitory media when executed further operable for updating a sensor entry for the identified isolated sensor device to specify the collection time and the collection location, and outputting an updated message indicating an updated incentive for obtaining updated sensor data from the identified sensor device based on the collection location.

12. The one or more non-transitory media of claim 10, wherein: the receiving of the request includes receiving a sensor registration request identifying deployment of the one or more isolated sensor devices, on behalf of the first of the sensor consumers, at respective one or more identified locations; and the one or more non-transitory media when executed further operable for associating the isolated sensor devices at the respective identified locations with the first of the sensor consumers, the message to the mobile collector device specifying the identified locations for the respective isolated sensor devices.

13. A method comprising:

receiving, by a mobile collector device from a broker device via a persistent data network, a message indicating an instruction for obtaining sensor data originated by one or more isolated sensor devices, the isolated sensor devices not reachable by any wired or wireless infrastructure;

establishing, while the mobile collector device is disconnected from the persistent data network and the wired or wireless infrastructure, a local data connection with the one or more isolated sensor devices based on being within proximity thereof;

the mobile collector device retrieving and storing the sensor data from the one or more isolated sensor devices via the local data connection based on the message; and the mobile collector device forwarding the sensor data to the broker device in response to having reconnected to the persistent data network following disconnecting from the local data connection, including receiving notification of a credit for forwarding the sensor data;

wherein the retrieving and storing includes:

creating collection metadata associated with the retrieving and storing of the sensor data, including a collection time and a collection location for the retrieving of the sensor data from a corresponding identified isolated sensor device, the collection location based on a determined location of the mobile collector device relative to the retrieving and storing; and storing the collection metadata with the sensor data and received sensor metadata identifying at least one of a sensor identifier, a sensor status, or a sensor location identifier.

14. The method of claim 13, wherein the retrieving and storing includes receiving at least a portion of the sensor data or the sensor metadata within a secure container inaccessible by the mobile collector device, the method further comprising displaying one or more unsecured portions of the sensor data or the sensor metadata to a user of the mobile collector device.

15. The method of claim 13, further comprising:

the mobile collector device generating, based on the message, a display for locating the one or more isolated sensor devices while the mobile collector device is disconnected from the persistent data network and the wired or wireless infrastructure, the display selectively identifying, for each isolated sensor device, at least one of a sensor identifier, an identified sensor location, a corresponding incentive for obtaining the corresponding sensor data, or direction information for locating the corresponding isolated sensor device.

16. An apparatus comprising:

a first device interface circuit configured for receiving, from a broker device via a persistent data network, a message indicating an instruction for obtaining sensor data originated by one or more isolated sensor devices, the isolated sensor devices not reachable by any wired or wireless infrastructure;

a second device interface circuit configured for establishing, while the apparatus is disconnected from the persistent data network and the wired or wireless infrastructure, a local data connection with the one or more isolated sensor devices based on being within proximity thereof;

a processor circuit configured for retrieving the sensor data via the local data connection from the one or more isolated sensor devices based on the message; and a memory circuit configured for storing the sensor data;

the processor circuit further configured for forwarding the sensor data to the broker device in response to the first device interface circuit having reconnected to the persistent data network following the second device interface circuit having disconnected from the local data connection, the processor circuit further configured for receiving notification of a credit for forwarding the sensor data, wherein:

the processor circuit is configured for creating collection metadata associated with the retrieving of the sensor data, including a collection time and a collection location for the retrieving of the sensor data from a corresponding identified isolated sensor device, the collection location based on a determined location of the apparatus relative to the retrieving; and the memory circuit configured for storing the collection metadata with the sensor data and received sensor metadata identifying at least one of a sensor identifier, a sensor status, or a sensor location identifier.

17. The apparatus of claim 16, wherein:

the second device interface circuit is configured for receiving at least a portion of the sensor data or the sensor metadata within a secure container inaccessible by the apparatus; and the processor circuit further configured for causing display, by the apparatus, of one or more unsecured portions of the sensor data or the sensor metadata to a user of the apparatus.

18. The apparatus of claim 16, wherein:

the processor circuit is configured for causing, based on the message, generation of a display for locating the one or more isolated sensor devices while the apparatus is disconnected from the persistent data network and the wired or wireless infrastructure; and the display selectively identifying, for each isolated sensor device, at least one of a sensor identifier, an identified sensor location, a corresponding incentive for obtaining the corresponding sensor data, or direction information for locating the corresponding isolated sensor device.

19. One or more non-transitory media encoded with logic for execution by a machine and when executed by the machine operable for:

receiving, by a mobile collector device from a broker device via a persistent data network, a message indicating an instruction for obtaining sensor data originated by one or more isolated sensor devices, the isolated sensor devices not reachable by any wired or wireless infrastructure;

establishing, while the mobile collector device is disconnected from the persistent data network and the wired or wireless infrastructure, a local data connection with the one or more isolated sensor devices based on being within proximity thereof;

the mobile collector device retrieving and storing the sensor data from the one or more isolated sensor devices via the local data connection based on the message; and the mobile collector device forwarding the sensor data to the broker device in response to having reconnected to the persistent data network following disconnecting from the local data connection, including receiving notification of a credit for forwarding the sensor data;

wherein the retrieving and storing includes:

creating collection metadata associated with the retrieving and storing of the sensor data, including a collection time and a collection location for the retrieving of the sensor data from a corresponding identified isolated sensor device, the collection location based on a determined location of the mobile collector device relative to the retrieving and storing: and storing the collection metadata with the sensor data and received sensor metadata identifying at least one of a sensor identifier, a sensor status, or a sensor location identifier.

20. The one or more non-transitory media of claim 19, wherein the retrieving and storing includes receiving at least a portion of the sensor data or the sensor metadata within a secure container inaccessible by the mobile collector device, the one or more non-transitory media when executed further operable for displaying one or more unsecured portions of the sensor data or the sensor metadata to a user of the mobile collector device.

21. The one or more non-transitory media of claim 19, when executed further operable for:

the mobile collector device generating, based on the message, a display for locating the one or more isolated sensor devices while the mobile collector device is disconnected from the persistent data network and the wired or wireless infrastructure, the display selectively identifying, for each isolated sensor device, at least one of a sensor identifier, an identified sensor location, a corresponding incentive for obtaining the corresponding sensor data, or direction information for locating the corresponding isolated sensor device.

* * * * *